US008573602B2

(12) United States Patent
Payne et al.

(10) Patent No.: US 8,573,602 B2
(45) Date of Patent: Nov. 5, 2013

(54) RADIAL SHAFT SEAL WITH DUST EXCLUSION AND HYDRODYNAMIC SEALING FEATURE

(75) Inventors: Andrew Payne, Grandville, MI (US); Brent R. Sedlar, Ann Arbor, MI (US); David M. Toth, Brighton, MI (US); Frederick R. Hatch, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 102 days.

(21) Appl. No.: 13/215,528

(22) Filed: Aug. 23, 2011

(65) Prior Publication Data
US 2013/0049306 A1 Feb. 28, 2013

(51) Int. Cl.
*F16J 15/32* (2006.01)
(52) U.S. Cl.
USPC .......................................................... 277/559
(58) Field of Classification Search
CPC .. F16J 15/3232; F16J 15/3244; F16J 15/3268
USPC ......................................... 277/559, 402, 572
See application file for complete search history.

(56) References Cited

U.S. PATENT DOCUMENTS

| 4,550,920 | A | * | 11/1985 | Matsushima | .................. | 277/559 |
| 5,664,651 | A | * | 9/1997 | Miura et al. | ............. | 188/322.17 |
| 5,915,696 | A | * | 6/1999 | Onuma et al. | ................. | 277/559 |
| 6,726,211 | B1 | * | 4/2004 | Kuroki et al. | ................. | 277/353 |
| 6,945,537 | B2 | | 9/2005 | Guillerme et al. | | |
| 2002/0163138 | A1 | * | 11/2002 | Dietle | ............................ | 277/559 |
| 2010/0109252 | A1 | * | 5/2010 | Matsui et al. | ................. | 277/559 |

FOREIGN PATENT DOCUMENTS

| EP | 1598580 | 11/2005 |
| EP | 2278196 | 1/2011 |

OTHER PUBLICATIONS

International Search Report PCT/US2012/036718 mailed on Aug. 27, 2012.

* cited by examiner

*Primary Examiner* — Vishal Patel
*Assistant Examiner* — Nathan Cumar
(74) *Attorney, Agent, or Firm* — Robert L. Stearns; Dickinson Wright, PLLC

(57) ABSTRACT

A radial shaft seal configured for receipt in a housing and about a shaft to sealingly isolate an air-side of the shaft seal from an oil-side of the shaft seal is provided. The seal includes an annular mounting portion and a seal lip operably attached to the mounting portion. The seal lip has an annular inner sealing surface extending axially between an oil-side end and a free air-side end. The inner sealing surface has a first groove region extending along the shaft in sealed engagement therewith and a second groove region extending along the shaft in sealed engagement therewith. The first groove region and the second groove region are spaced axially from one another by an intermediate non-grooved region. The first groove region is configured to direct contamination toward the air-side of the seal and the second groove region is configured to direct lubrication toward the oil-side of the seal.

14 Claims, 2 Drawing Sheets

US 8,573,602 B2

RADIAL SHAFT SEAL WITH DUST EXCLUSION AND HYDRODYNAMIC SEALING FEATURE

BACKGROUND OF THE INVENTION

1. Technical Field

This invention relates generally to dynamic oil seals of the type for creating a fluid tight seal between a rotating shaft and a housing.

2. Related Art

Dynamic radial shaft oil seals are designed to have a so-called "oil-side" of the seal and an "air-side." These designations pertain to the orientation of the seal when installed, with the oil-side facing the interior of the housing and in communication with the oil, whereas the air-side faces outwardly and is exposed to the air.

During use, it is desirable to keep dust and other contaminants on the air-side of the seal while maintaining lubrication on the oil-side of the seal. It is known to incorporate spiral grooves in a seal lip to pump lubrication back to the oil-side of the seal, however, these grooves do not act to keep out dust or other contaminants. As a matter of fact, if dust or contamination enters the grooves, it will tend to be pumped along with lubrication to the oil-side of the seal. This has undesirable affects on the seal, and ultimately reduces the useful life of the seal and possible bearings or other components that the seal is protecting.

Further, it is known to incorporate spiral grooves in a seal lip to keep dust and contamination on the air-side of the seal, however, these grooves do not act to maintain lubrication on the oil-side of the seal. As a matter of fact, if lubrication enters the grooves, it will tend to be pumped outwardly to the air-side of the seal, thereby depleting the lubrication within the seal. This has undesirable affects on the seal, and ultimately reduces the useful life of the seal and possible bearings or other components that the seal is protecting.

SUMMARY OF THE INVENTION

In general terms, this invention provides a radial shaft seal assembly having features that facilitate making a proper oil side installation, even in conditions of shaft-to-bore misalignment, and further, provide support for a seal lip of the seal assembly against adverse seal-breaking movement when exposed to positive or negative pressure on an oil side of the seal assembly when installed.

In accordance with one presently preferred aspect of the invention, a radial shaft seal configured for receipt in a housing and about a shaft to sealingly isolate an air-side of the shaft seal from an oil-side of the shaft seal is provided. The seal includes an annular mounting portion; an elastomeric seal body connected to the mounting portion, and a seal lip connected to the seal body. The seal lip has an annular inner sealing surface extending axially between an oil-side end and a free air-side end. The inner sealing surface has a first groove region extending along the shaft in sealed engagement therewith and a second groove region extending along the shaft in sealed engagement therewith. The first groove region and the second groove region are spaced axially from one another by an intermediate non-grooved region. The first groove region is configured to direct contamination toward the air-side of the seal and the second groove region is configured to direct lubrication toward the oil-side of the seal.

In accordance with another aspect of the invention, the first groove region has a plurality of first grooves oriented in a first direction and the second groove region has a plurality of second grooves oriented in a second direction wherein the first direction is different from the second direction.

In accordance with another aspect of the invention, the first grooves overlap one another along an axial direction and the second grooves overlap one another along an axial direction.

In accordance with another aspect of the invention, the first grooves overlap one another along an axial direction and the second grooves are in non-overlapping relation with one another along an axial direction.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
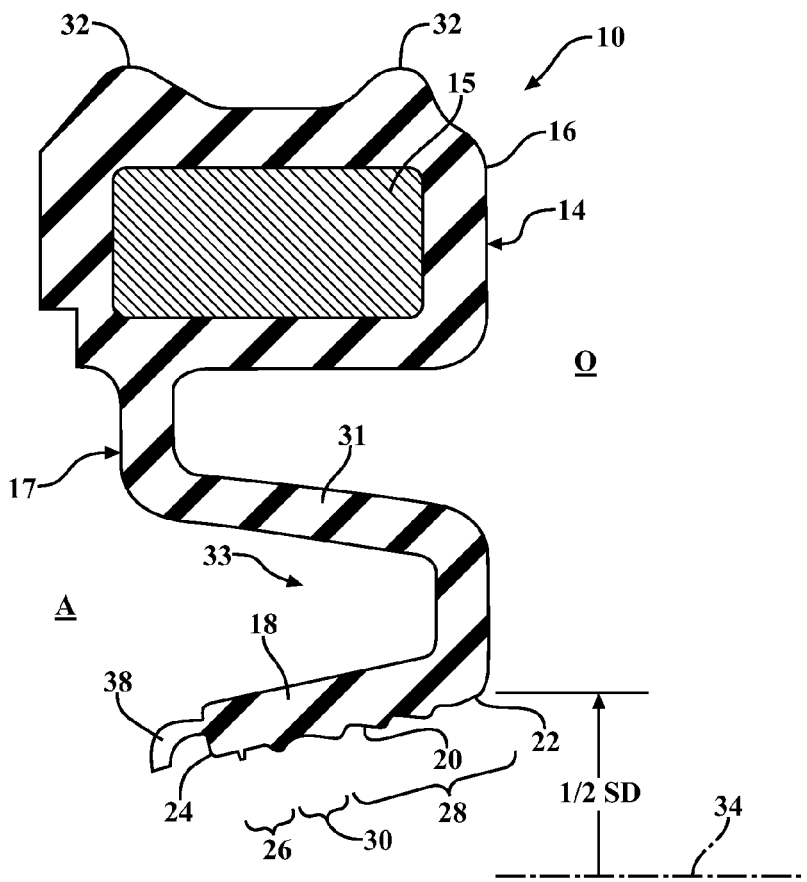
FIG. 1 is cross-sectional view of a radial shaft seal constructed according to one aspect of the invention.
Figure 1A:
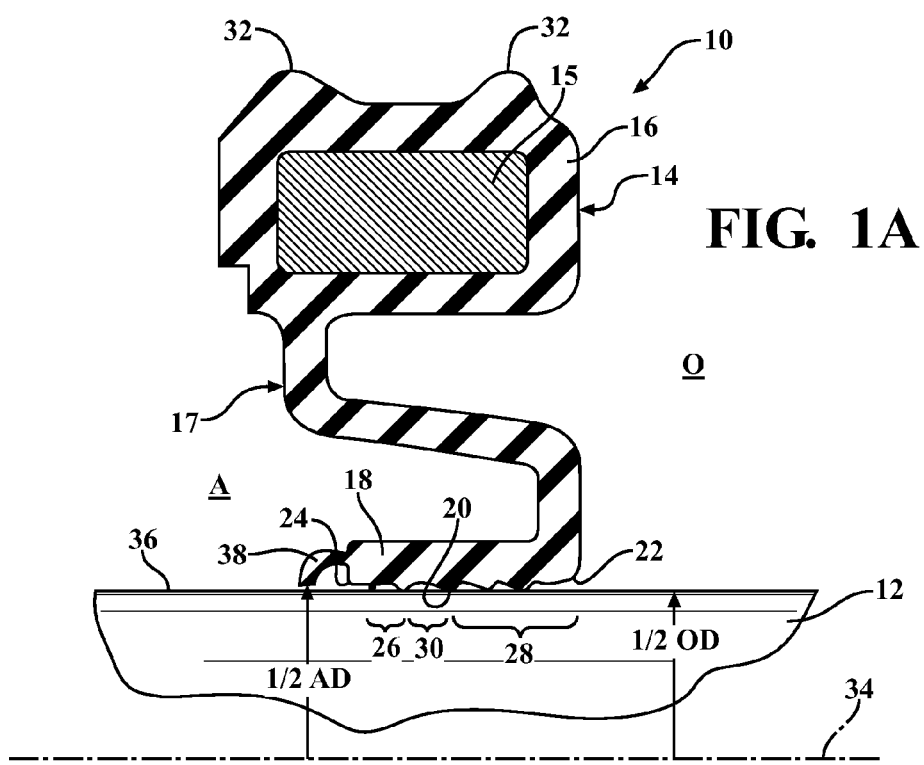
FIG. 1A is a view similar to FIG. 1 showing the seal disposed on a shaft.

Referring in more detail to the drawings, FIGS. 1 and 1A illustrate a radial shaft seal, referred to hereafter as seal 10, constructed in accordance with one aspect of the invention, wherein the seal is suitable for use in a crankcase application, by way of example and without limitation, for sealing about a rotatable shaft 12 in a radial shaft seal assembly. The seal 10 has an oil-side O and an axially opposite air-side A, in relation to the orientation of the seal 10 when installed, with the oil-side O facing the interior of the application being sealed and the air-side A facing the outside environment of the application being sealed. The seal 10 includes a mounting portion, such as an outer case, also referred to as collar 14, provided as a metal or polymeric annulus or ring structure 15 with an elastomeric seal material 16 attached thereto. The elastomeric material 16 forms a seal body 17 and extends radially inwardly to provide a seal lip 18. The seal lip 18 has an annular inner sealing surface 20 extending axially between an oil-side end 22 and a free air-side end 24. The inner sealing surface 20 has a first groove region 26 extending along the shaft 12 in sealed engagement therewith and a second groove region 28 extending along the shaft 12 in sealed engagement therewith. The first groove region 26 and the second groove region 28 are spaced axially from one another by an annular intermediate non-grooved region 30. The first groove region 26 is configured to direct contamination, such as dust, toward the air-side A and the second groove region 28 is configured to direct lubrication toward the oil-side O, while the intermediate non-groove region 30 prevents the first and second groove regions 26, 28 from interacting with one another. Accordingly, contamination is prevented from migrating from the air-side A to the oil-side O, while lubrication is prevented from migrating from the oil-side O to the air-side A.

The metal collar 14 may be L-shaped, or may take on any number of configurations, such as C-shaped, S-shaped, or ring shaped, as shown, depending upon the requirements of a particular application, as is known in the art. The metal reinforcing ring structure 15 is shown covered at least in part with the elastomeric seal material 16 on an outer surface which may be contoured with undulations 32 to provide a snug and fluid tight installation in the bore of the crankcase (not shown).

An annular bridge 31 operably connects the seal lip 18 to the seal body 17. The annular bridge 31 is connected to the oil side end 22 of the seal lip 18 and to the seal body 17, such that the bridge 31 extends radially outwardly generally transversely from the seal lip 18 and then back over the seal lip 18 in overlying fashion at an angle to the central axis 34, such as between about 20-40 degrees, though the angle can range from 1-89 degrees from horizontal. Thus, the bridge 31 provides an annular pocket 33 facing the air-side A of the seal assembly 10.

The seal lip 18, when in the relaxed, uninstalled state, extends slightly angled by a few degrees, such as between about 1-10 degrees from a horizontal central axis 34 of the seal 10. The sealing surface 20, while in its free state, has a maximum inner diameter SD at the oil-side end 22 that is less than an outer diameter OD of a running surface 36 of the shaft 12, and thus, the entire inner sealing surface 20 is assured of being brought into sealed engagement with the running surface 36 in use. Further, the air-side end 24 can be formed having a non-contact dust exclusion lip, also referred to as auxiliary lip 38, that facilitates prevention of contamination ingress from the air-side A to the oil-side O of the seal assembly 10. The auxiliary lip 38 is spaced from the first groove region 26 and has an inner diameter AD greater than the inner diameter SD of the inner sealing surface 20 so as to remain free from contact with the shaft 12.

Figure 2:
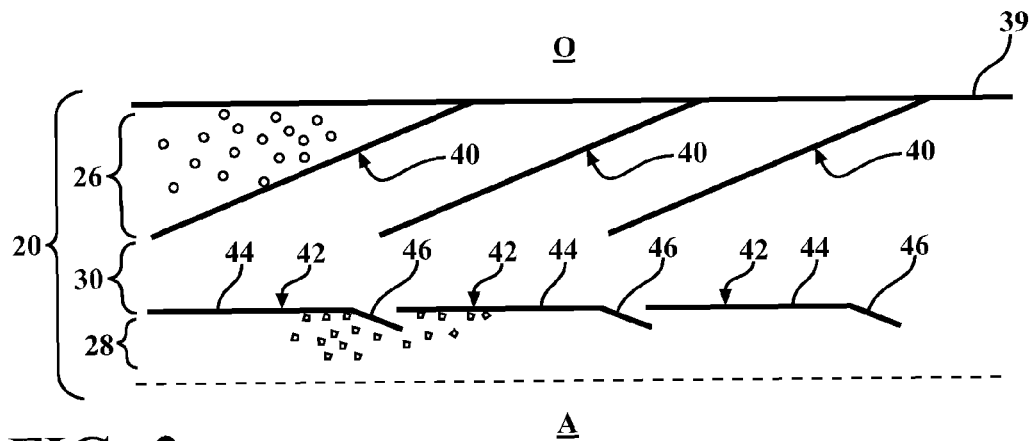
FIG. 2 is a schematic view of a sealing surface of the seal constructed according to one aspect of the invention.

In FIG. 2, the inner sealing surface 20 is shown constructed in accordance with one aspect of the invention. The inner sealing surface 20 has an annular static sealing band 39 at the oil-side end 22 to prevent lubrication from egress while the shaft 12 and seal 10 are static relative to one another. The first groove region 26 has a plurality of first grooves 40 extending from the static sealing band 39 to the intermediate non-groove region 30. The first grooves 40 are oriented in a first direction and the second groove region 28 has a plurality of second grooves 42 oriented in a second direction, wherein the first direction is different from the second direction. The first grooves 40 are shown as being linearly straight and extending parallel or substantially parallel with one another in inclined relation to the circumferential direction of shaft movement. The angle of inclination diverges axially along the direction of shaft rotation from the intermediate non-groove region 30 toward the oil-side O. The first grooves 40 adjacent one another overlap one another along an axial direction.

The second grooves 42 are shown being non-linear, having a linearly straight first portion 44 extending circumferentially along the direction of shaft rotation and a linearly straight second portion 46 inclined relative to the first portion 44. Each of the second portions 46 overlap an adjacent first portion 44 of an adjacent second groove 42 along an axial direction. Accordingly, a labyrinth is formed between adjacent first and second portions 44, 46, thereby acting to prevent contamination, e.g. dust, from migrating from the air-side A to the oil-side O.

Figure 3:
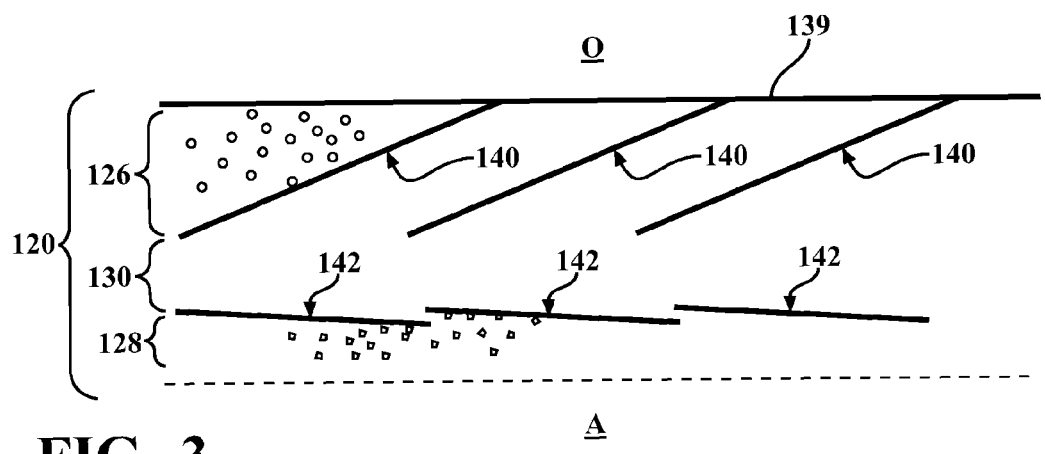
FIG. 3 is a schematic view of a sealing surface of the seal constructed according to another aspect of the invention.

In FIG. 3, an inner sealing surface 120 is shown constructed in accordance with another aspect of the invention, wherein the same reference numerals, offset by a factor of 100, are used to identify like features. The inner surface 120 includes a first groove region 126, a second groove region 128, an intermediate non-groove region 130 between the first and second groove regions 126, 128, and a static sealing band 139. The first groove region 126 has a plurality of first grooves 140 configured the same as the first grooves 40 discussed above. Further, the second groove region 128 has a plurality of second grooves 142, however, unlike the second grooves 42 discussed above, the second grooves 142 are linearly straight. The second grooves 142 are shown extending parallel or substantially parallel with one another in inclined relation to the circumferential direction of shaft movement. The angle of inclination diverges axially along the direction of shaft rotation from the intermediate non-groove region 130 toward the air-side A. The second grooves 142 adjacent one another overlap one another along an axial direction, thereby forming labyrinths to prevent the ingress of contamination.

Figure 4:
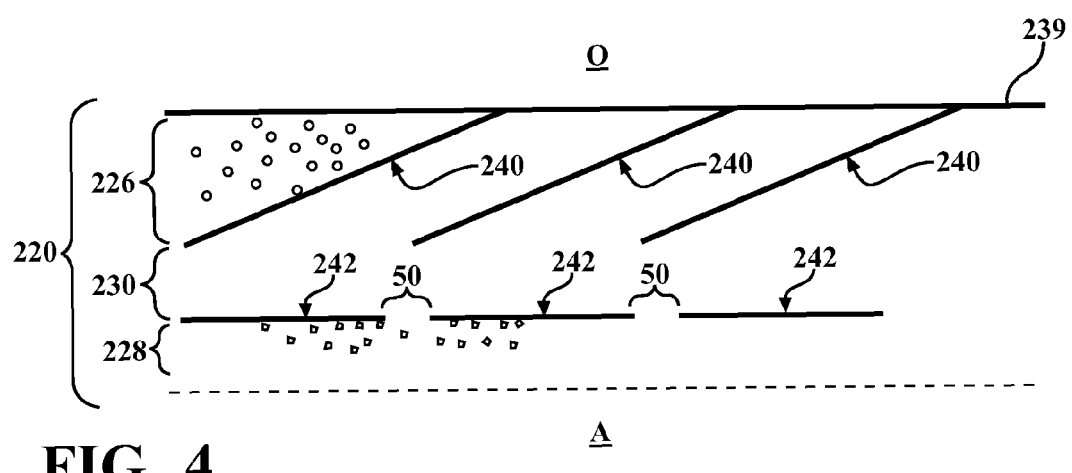
FIG. 4 is a schematic view of a sealing surface of the seal constructed according to yet another aspect of the invention.

In FIG. 4, the inner sealing surface 220 is shown constructed in accordance with another aspect of the invention, wherein the same reference numerals, offset by a factor of 200, are used to identify like features. The inner surface 220 includes a first groove region 226, a second groove region 228, an intermediate non-groove region 230 between the first and second groove regions 226, 228, and a static sealing band 239. The first groove region 226 has a plurality of first grooves 240 configured the same as the first grooves 40, 140 discussed above. Further, the second groove region 228 has a plurality of second grooves 242, however, the second grooves 242 are configured in non-overlapping relation with one another along an axial direction. The second grooves 242 are linearly straight and aligned with one another about a circumference of the seal lip. Accordingly, the second grooves 242 are spaced circumferentially from one another by circumferentially extending gaps 50.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air-side of the shaft seal from an oil-side of the shaft seal, comprising:
   an annular mounting portion;
   an elastomeric seal body connected to said mounting portion; and
   a seal lip connected to said seal body, said seal lip having an annular inner sealing surface extending axially between an oil-side end and a free air-side end, said inner sealing surface having a first groove region extending along the shaft in sealed engagement therewith and a second groove region extending along the shaft in sealed engagement therewith, said first groove region and said second groove region being spaced axially from one another by an intermediate non-grooved region, said first groove region being configured to direct contamination toward said air-side and said second groove region being configured to direct lubrication toward said oil-side;
   said first groove region comprising a plurality of first grooves oriented at an angle to the circumferentially duration of shaft rotation;
   said second groove region comprising a plurality of second grooves extending substantially circumferentially along the direction of the shaft rotation; and
   wherein said first grooves are linearly straight and said second grooves have a first portion extending circumferentially along the direction of shaft rotation and a second portion inclined relative to said first portion.

2. The radial shaft seal of claim 1 wherein said free air-side end includes an annular auxiliary lip spaced axially from said first groove region.

3. The radial shaft seal of claim 2 wherein said auxiliary lip has an inner diameter greater than said inner sealing surface to remain free from contact with the shaft.

4. The radial shaft seal of claim 1 wherein said first grooves overlap one another along an axial direction.

5. The radial shaft seal of claim 4 wherein said second grooves overlap one another along an axial direction.

6. The radial shaft seal of claim 4 wherein said second grooves are substantially linear and are spaced circumferentially from one another by circumferentially extending gaps.

7. The radial shaft seal of claim 1 wherein each of said second portions overlap an adjacent one of said first portions along an axial direction.

8. A radial shaft seal configured for receipt in a housing and about a shaft to sealingly isolate an air-side of the shaft seal from an oil-side of the shaft seal, comprising:
   an annular mounting portion;
   an elastomeric seal body connected to said mounting portion;
   a seal lip portion connected to said seal body; and a bridge portion connecting together said seal body and said seal lip; said seal lip having an annular inner sealing surface extending axially between an oil-side end and a free air-side end, said inner sealing surface having a first groove region extending along the shaft in sealed engagement therewith and a second groove region extending along the shaft in sealed engagement therewith, said first groove region and said second groove region being spaced axially from one another by an intermediate non-grooved region, said first groove region being configured to direct contamination toward said air-side and said second groove region being configured to direct lubrication toward said oil-side;
   said seal lip portion when in the relaxed, uninstalled state, extends at an angle of 1-10° from a horizontal central axis of said annular mounting position;
   said first groove region comprising a plurality of first grooves oriented at an angle to the circumferentially direction of shaft rotation; and said second groove region comprising a plurality of second grooves extending substantially circumferentially along the direction of the shaft rotation; and
   wherein said first grooves are linearly straight and said second grooves have a first portion extending circumferentially along the direction of shaft rotation and a second portion inclined relative to said first portion.

9. The radial shaft seal as set forth in claim 8 wherein said free air-side end includes an annular auxiliary lip spaced axially from said first groove region.

10. The radial shaft seal as set forth in claim 9 wherein said auxiliary lip has an inner diameter greater than said inner sealing surface to remain free from contact with the shaft.

11. The radial shaft seal of claim 8 wherein said first grooves overlap one another along an axial direction.

12. The radial shaft seal as set forth in claim 11 wherein said second grooves overlap one another along an axial direction.

13. The radial shaft seal as set forth in claim 11 wherein said second grooves are substantially linear and are spaced circumferentially from one another by circumferentially extending gaps.

14. The radial shaft seal as set forth in claim 8 wherein each of said second portions overlap an adjacent one of said first portions along an axial direction.

* * * * *